Patented Sept. 12, 1950

2,522,445

UNITED STATES PATENT OFFICE 2,522,445

MISCIBLE MIXTURE OF ALPHA-CYANO-ACETAMIDE AND AN ACRYLONITRILE POLYMER

George E. Ham, Dayton, Ohio, assignor to Monsanto Chemical Company, St. Louis, Mo., a corporation of Delaware No Drawing. Application March 25, 1948,
Serial No. 17,095

8 Claims. (Cl. 260—32.6)

This invention relates to a new method of preparing synthetic fibers from polymers and copolymers of acrylonitrile. More particularly the invention relates to completely miscible mixtures of the polymer and alpha-cyanoacetamide, from which mixtures it is possible to prepare high tenacity fibers by extrusion methods.

It is well known that polyacrylonitrile and copolymers of acrylonitrile have excellent fiber forming properties. The general technique of preparing fibers from acrylonitrile involves the dissolution of the polymer in a suitable solvent and thereafter extruding the solution through an orifice, or a spinnerette containing a plurality of orifices, into a medium which removes the solvent from the solution and precipitates the solid acrylonitrile polymer in a long continuous body. Although many solvents have been proposed, the use of most of them is impracticable by reason of the cost of the solvent, or the excessively high viscosity of solution containing optimum proportions of the polymer. Conventional solvents cannot usually be heated to the point where viscosity characteristics are favorable.

The primary purpose of this invention is to provide a new solvent which is inexpensive, readily available in suitable quantities, and is capable of being blended with acrylonitrile polymer to form a readily extrudable soft solid or liquid mass containing a relatively high proportion of the polymer. Another purpose is to provide an extrudable solution of polymer of relative low viscosity which is stable at temperatures of 150° C. to 250° C. A further purpose of this invention is to provide a new method of spinning acrylonitrile polymers to form fibers of high tensile strength and desirable elongation.

It is known that acetamide is not a solvent for acrylonitrile polymers, but that N,N-dimethyl formamide is a good solvent. By analogy to these facts it has been popularly believed that the N,N-diamethyl function is critical and necessary for the development of the desirable solvent properties. It has now been found contrary to accepted theories of solubilization of acrylonitrile polymers, that alpha-cyanoacetamide is an excellent solvent. This fact has escaped previous discovery because the physical constants of the compound are such as to lead one skilled in the art to believe the compound unsuitable for such uses. Although higher temperatures are required for spinning, the use of such temperatures is not objectionable because the viscosity characteristics are so favorable.

It has been found that alpha-cyanoacetamide is capable of dissolving polyacrylonitrile and copolymers of more than 70 percent acrylonitrile and minor proportions of one or more other copolymerizing monomers, such as vinyl acetate, vinyl propionate, vinyl chloride, the alkyl acrylates, the alkyl methacrylates, acrylamide, methacrylamide, acrylic acid, methacrylic acid and methacrylonitrile.

A very desirable class of copolymers useful in the practice of this invention are the copolymers of 75 to 97 percent of acrylonitrile, two to 18 percent of methacrylonitrile, and from one to ten percent of vinyl acetate. These copolymers are described and claimed in copending application, Serial No. 786,153, filed November 14, 1947, by Reid G. Fordyce and George E. Ham.

Other desirable polymers useful in the practice of this invention are the copolymers of monomeric mixtures of acrylonitrile and up to 30 percent of other monomers which tend to improve the spinnability of the polymeric acrylonitrile. Most important of these comonomers is vinyl acetate. Copolymers of 80 to 99 percent of acrylonitrile and from one to 20 percent of vinyl acetate are excellent fiber forming polymers which have very desirable spinning properties, especially from solutions in alpha-cyanoacetamide in accordance with this invention.

In the practice of this invention, as it is in the preparation of all acrylonitrile fibers, the molecular weight of the polymer is of critical importance. The polymers should have a molecular weight in excess of ten thousand and preferably in excess of twenty-five thousand. These molecular weights are determined by measuring the viscosity in suitable solvents in the manner well known to the art. It is also very desirable to use acrylonitrile polymers which are substantially uniform throughout especially with respect to composition and molecular weight. These uniform copolymers enable the practice of the invention more economically, permit the utilization of continuous uninterrupted spinning, and greatly minimize fiber fractures and clogging of the spinnerettes.

In the practice of this invention the polymers of acrylonitrile are used in a finely subdivided form. Although massive polymers may be ground to desired form, preferably emulsion polymerization procedures are employed in the preparation of the polymers, and the subdivided state in which the polymer is obtained by precipitation of the emulsion may be used directly. The finely divided polymer is mixed with the alpha-cyanoacetamide in any type of mixing device, such as a dough mixer, Banbury mixer, or roll mill. If desired the polymer and alpha-cyanoacetamide may be blended at temperatures below the melting point of the alpha-cyanoacetamide, but generally temperatures in excess of the melting point (119° C.) are desirable, at least for some period of time prior to extruding. It is desirable to use as high a concentration of polymer as possible in the spinning solution, but the maximum concentration is dependent upon the molecular weight of the polymer. To obtain fibers of optimum physical properties polymers of molecular weights in excess of 25,000 are used and even with such polymers it is possible to dissolve 10 to 50 percent in the alpha-cyanoacetamide without exceeding practical viscosity values. Although as little as five percent of polymer can be used in spinning solutions, such concentrations are undesirable because they necessitate the removal of too much solvent from the extruded solution, thereby increasing solvent recovery costs, as well as reducing spinning speeds by lengthening the period required for coagulation. The concentration of polymer in the spinning bath is preferably between 25 and 35 percent, which is a higher concentration than can ordinarily be achieved when conventional solvents are used. The viscosity will depend on the chemical composition, the molecular weight of the polymer and the temperature at which the spinning takes place. It has been found that a solution of 35 percent will spin readily at a temperature of 200° C.

The fibers are spun by extruding the polymer solution through an orifice, or a spinnerette having a plurality of orifices, into a medium which removes the solvent. The volume of solution passed through the spinnerette must be constant in order to produce a fiber of uniform size. This is best achieved by using a positively driven gear pump adapted to deliver a constant flow of solution regardless of minor changes in viscosity and of the resistance offered by the spinnerette. It is also desirable to pass the solution which has been prefiltered, through one or more filters before the spinnerette to remove the last traces of foreign matter and particles of incompletely dissolved polymer. The polymer may be delivered to the gear pump by pressure applied by an inert gas to the solution reservoir, which is heated if necessary to make the solution fluid enough to pass through the conduits. The extruding operation should be conducted at elevated temperatures, but well below the boiling point of the solvent to facilitate the handling of the filament.

The medium into which the solution is extruded and which removes the solvent may be either liquid or gaseous. The method involving the use of the former, known as "wet spinning," usually utilizes salt solutions or other liquids which boil above the melting point of the alpha-cyanoacetamide and a solvent therefor, but in which the polymer is insoluble. The alpha-cyanoacetamide is leached out of the stream of polymer solution which becomes a viscous stream and finally a solid filament. When a spinnerette with a plurality of apertures is used the several streams of polymer converge to form a single fiber strand in which the individual fibers do not cohere. The spin-bath must necessarily be of sufficient size to permit the complete or substantially complete removal of the alpha-cyanoacetamide. Obviously the rapidity of extrusion will affect the size of the spin bath, high speeds requiring much longer baths. The temperature of the bath affects the size, higher temperatures promoting more rapid diffusion of the alpha-cyanoacetamide out of the fiber and permitting the use of shorter baths.

Frequently production speeds require longer baths than are industrially practicable, and under such conditions spinning into a gaseous medium is preferred. In the practice of this method air, steam, nitrogen or other gas, or mixture of gases, which are inert at the spin temperature are used as the medium. This method operates at higher temperatures and the alpha-cyanoacetamide is evaporated from the surface of the fiber. The maximum temperature to which the fiber can be subjected is about 240° C., since decomposition of the alpha-cyanoacetamide may take place at higher temperatures. The fiber may be heated by convection from the hot gaseous medium or by radiation from the walls of the confining vessel. Generally a combination of both convection and radiation is involved. The use of radiation heating is more efficient and permits operation with the wall temperature considerably in excess of the boiling point of the alpha-cyanoacetamide. The evaporation of the alpha-cyanoacetamide from the surface of the fiber and the speed of the fiber, prevents the filament temperatures from exceeding the boiling point of the alpha-cyanoacetamide. The method of spinning into a gaseous medium, known as "dry spinning," is particularly adapted to high rates of extrusion.

Some spinning methods may involve a combination of wet and dry spinning. For example, a fiber may be extruded at temperatures of 150° C. to 250° C., into an inert gaseous medium, and after cooling somewhat, washed with water or other liquid at a temperature not substantially below that of the cooled fiber.

In general the methods of both wet and dry spinning which are commercially in use are readily adaptable to spinning from alpha-cyanoacetamide solutions. Similarly conventional automatic machinery for spinning continuously, drying the thread if necessary, and winding it upon suitable spools can be used. As in the case of most synthetic fibers, the acrylonitrile polymer fibers spun from alpha-cyanoacetamide must be oriented by stretching to develop optimum physical properties. If desired part of this stretching may be accomplished in the spin bath by drawing the fiber out of the bath at a rate more rapid than the rate of extrusion.

Although the invention may be practiced with any of the modifications described in the preceding specification it is obvious that other changes or modifications may be made without departing from the nature and the spirit of the invention. The details set forth in the preceding specification are not to be construed as limitations upon the scope of the invention except to the extent incorporated in the following claims.

I claim:

1. A new composition of matter comprising a homogeneous miscible mixture of alpha-cyanoacetamide and polyacrylonitrile.

2. A new composition of matter comprising a homogeneous miscible mixture of alpha-cyanoacetamide and a copolymer of 75 to 97 percent of acrylonitrile, two to 18 percent of methacrylonitrile, and from one to ten percent of vinyl acetate.

3. A new composition of matter comprising a homogeneous miscible mixture of alpha-cyanoacetamide and a copolymer of 80 to 99 percent acrylonitrile and from one to 20 percent of vinyl acetate.

4. A new composition of matter comprising a homogeneous miscible mixture of from 50 to 95 percent by weight of α-cyanoacetamide and from 5 to 50 percent of a polymer of a monoolefinic substance in which at least 70 percent of the polymerizable content is acrylonitrile.

5. A new composition of matter comprising a homogeneous miscible mixture of 50 to 95 percent by weight of α-cyanoacetamide and 5 to 50 percent of polyacrylonitrile.

6. A new composition of matter comprising a homogeneous miscible mixture of from 50 to 95 percent by weight of α-cyanoacettmide and from 5 to 50 percent of a copolymer of 75 to 97 percent by weight of acrylonitrile, two to 18 percent of methacrylonitrile and from one to ten percent of vinyl acetate.

7. A new composition of matter comprising a homogeneous miscible mixture of from 50 to 95 percent by weight of α-cyanoacetamide and a copolymer of from 80 to 99 percent by weight of acrylonitrile and from one to 20 percent of vinyl acetate.

8. A new composition of matter, comprising a homogeneous miscible mixture of α-cyanoacetamide and a polymer of a monoolefinic substance in which at least 70 percent of the polymerizable content is acrylonitrile.

GEORGE E. HAM.

REFERENCES CITED

The following references are of record in the file of this patent:

UNITED STATES PATENTS

| Number | Name | Date |
|---|---|---|
| 2,404,716 | Hansley | July 23, 1946 |